United States Patent Office 3,449,300
Patented June 10, 1969

3,449,300
STYRENE/DIALKYL FUMARATE PROCESS
Robert J. Slocombe, Kirkwood, Mo., and Ronald H. Dahms, Springfield, and Charles R. Williams, Longmeadow, Mass., assignors to Monsanto Company, St. Louis, Mo., a corporation of Delaware
No Drawing. Filed Aug. 19, 1965, Ser. No. 481,103
Int. Cl. C08f 1/34, 19/10
U.S. Cl. 260—78.5                                6 Claims

ABSTRACT OF THE DISCLOSURE

Disclosed herein is a process for copolymerization of styrene and dialkyl fumarates containing from 20 to 24 carbon atoms which comprises subjecting a mixture of said monomer to polymerization conditions in aqueous emulsion in the presence of a water-soluble polymerization catalyst, introducing an emulsified mixture of said monomers to the reaction mixture at about the time copolymerization begins, the composition of said added monomers being substantially the same as the composition of monomers chemically combined in the forming copolymers, and continuing the addition of emulsified monomer mixture during a substantial part of the copolymerization period at about the same rate the copolymer is formed.

---

This invention relates to a process for the production of copolymers of styrene and certain dialkyl fumarates.

Copolymers of styrene and dialkyl fumarates have been described previously and processes for their production are known in the art. In the processes heretofore known and described, long chain dialkyl fumarates are copolymerized with styrene by using bulk or solution polymerization techniques. Batch emulsion polymerization of dialkyl fumarates and styrene is known to produce copolymer in latex form but only when the total number of carbon atoms in the alkyl portions of the ester groups, taken together, is equal to or less than about 14 carbon atoms. When the total number of carbon atoms is increased to 16 or more and batch emulsion polymerization is used, polystyrene is produced and most of the dialkyl fumarate is recovered as monomer.

Although styrene/dialkyl fumarate copolymer latices can be prepared by simple batch emulsion polymerization where the total number of carbon atoms in the alkyl groups is equal to or less than 14 carbon atoms, such latices are not entirely satisfactory in that without using any softening or plasticizing agents they possess relatively poor film-forming properties. Styrene/dialkyl fumarate copolymer latices wherein the alkyl portions of the fumarate, taken together, contain 16 or more carbon atoms possess excellent film-forming properties without the use of plasticizers or softening agents.

An object of this invention is to provide a novel emulsion process for the production of copolymers of styrene and certain dialkyl fumarates. A further object is to provide styrene/dialkyl fumarate copolymers in latex form having excellent film-forming properties without the use of plasticizers or softening agents.

As mentioned above, it has been found that whether styrene and dialkyl fumarates can be copolymerized by simple batch emulsion techniques is directly related to the alcohol with which the fumaric acid is esterified. Fumaric acid esters which cannot be copolymerized with styrene by simple batch emulsion polymerization techniques but which can be copolymerized with styrene in accordance with the process of this invention are represented by the formula

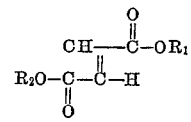

wherein $R_3$ and $R_2$ which may be the same or different, are selected from the group consisting of alkyl radicals having from 1 to 19 carbon atoms and the total number of carbon atoms in the radicals $R_1$ and $R_2$, taken together, is from 16 to 20.

The alcohol residues, i.e. $R_1$ and $R_2$ are preferably those of saturated, straight chain or branch chain alcohols having from 4 to 16 carbon atoms but regardless of saturation or unsaturation and chain configuration, the total number of carbon atoms in both alcohol residues, taken together, must be from 16 to 20. It is not necessary that the carboxy groups of the fumaric acid be esterified with the same alcohol or that the copolymer be formed with but a single fumaric acid ester. Mixed esters where 2, 3 or even 4 different alcohol residues are present may also be employed. It is only necessary that the fumaric acid ester or mixed ester fall within the formula given to be copolymerized with styrene in accordance with the process of this invention. The alkyl esters of fumaric acid can be prepared by any of the well-known methods.

The fumaric acid esters represented by the above structural formula have the empirical formula $C_nH_{2n-4}O_4$ where $n$ is an integer from 20 to 24. For the sake of brevity and simplicity the empirical formula will be used hereinafter in the specification and claims to represent the structural formula and limitations thereon given above.

The above and other objects are accomplished according to this invention by carrying out the process which comprises effecting copolymerization of a mixture of styrene and fumaric acid ester having the empirical formula $C_nH_{2n-4}O_4$, wherein $n$ is an integer from 20 to 24, in aqueous emulsion in the presence of water-soluble polymerization catalyst, introducing an emulsified mixture of said monomers to the polymerization reaction mixture at about the time copolymerization begins, the composition of said added monomers being substantially the same as the composition of the monomers chemically combined in the forming copolymer continuing the addition of emulsified monomer mixture during a substantial part of the copolymerization period at about the same rate copolymer is formed. In the preferred embodiment of this invention monomer soluble catalyst is used in addition to the water soluble catalyst. The monomer soluble catalyst is admixed with the monomers added during the reaction prior to their emulsification.

The addition of the emulsified monomer mixture to the polymerization reaction mixture can be carried out either continuously or intermittently. When intermittent addition is employed it is preferred that the increments of monomer addition be of such size and frequency that the concentration of constituents in the copolymerizing monomer mixture does not vary more than would cause a variation of more than about 15 percent in concentration of the major constituent in the copolymer from the average concentration of that constituent therein.

The process of this invention is advantageous in that it effectuates the direct formation of styrene/fumarate copolymer latex having highly desirable film-forming properties without the use of plasticizers or softening agents. The preferred aspect of this invention results in increased conversion of styrene and/or dialkyl fumarate. The increased conversion of dialkyl fumarate is particularly advantageous in that it reduces the amount of coagulum present in the latex and thus a more stable latex is produced. In addition, polymerization rates are significantly greater and copolymer composition heterogeneity and clarity are more controllable in the process of this invention than with mass or solution polymerization procedures.

In carrying out the process of this invention, an aqueous solution is made up containing emulsifying agent and water-soluble polymerization catalyst. Any conventional emulsion polymerization equipment can be used. The initial monomer mixture of composition which will give copolymer having the desired percentage of monomer constituents therein is emulsified with the aqueous solution containing emulsifying agent and polymerization catalyst and the resulting emulsion is subjected to polymerization conditions. At substantially the time copolymerization starts, additional monomers in the form of aqueous emulsion polymerization equipment can be used. The mixture at about the same rate copolymer is being formed. The composition of the emulsified monomer mixture introduced during the polymerization period is substantially the same as the composition of the desired copolymer being formed. To produce substantially homogeneous copolymers by this invention, the gradual addition of the emulsified monomer mixture should be extended over almost the full time required to copolymerize both the specific dialkyl fumarate and the proportion of dialkyl fumarate used. A supplemental heating time, with or without catalyst addition, equal to less than about 25 percent of the addition time may be used.

The monomer content of the initial emulsified mixture of monomers is generally from about 5 percent to 40 percent based on the total weight of the initial emulsion. The monomer content of the emulsified mixture of monomers introduced into the reaction mixture during the polymerization period is generally from about 5 percent to 80 percent based on the total weight of the added emulsion.

The process of this invention has been found effective in the production of styrene/dialkyl fumarate copolymers containing from about 15 percent to 75 percent polymerized dialkyl fumarate. The preferred styrene dialkyl fumarate film-forming latices are those having from about 24 percent to 62 percent by weight of polymerized dialkyl fumarate. In order to prepare these preferred latices initial monomer mixtures containing from about 7 percent to 45 percent by weight of dialkyl fumarate are used. With di-n-decyl fumarate the fumarate concentration in the initial monomer mixture is about 7 percent to 25 percent by weight of the initial monomer mixture in order to form the preferred latices. With di-n-octyl fumarate the fumarate concentration in the initial monomer mixture is about 9 percent to 45 percent by weight.

The exact composition of the initial monomer mixture needed to obtain copolymer of any desired composition within the above ranges is easily determined. The composition of an initial monomer mixture is selected arbitrarily and subjected to given reaction conditions. The first copolymer formed is withdrawn from the reaction mixture and analyzed. If this copolymer does not contain the desired proportion of polymerized monomer, the initial monomer composition is adjusted and the procedure repeated. It is only a matter of a few trials and the exact composition of initial monomer is determined that will give the desired copolymer.

As stated hereinbefore the composition of the monomers in the emulsified monomer mixture added during the reaction is substantially the same as the composition of the desired copolymer. The rate of addition of the emulsified monomer mixture added during the reaction should be substantially the same as the rate at which copolymer forms. An addition rate somewhat in excess of reaction rate is not deleterious to the process as the polymerization can be continued for a substantial period after monomer addition is complete. Since polymerization reactivity of monomers may be effected by different catalysts, amounts of catalyst, temperatures and pressures, the addition rates will vary with differing sets of conditions. Reaction rate and therefore rate of addition of emulsified monomer mixture is easily ascertained by running a trial process, withdrawing samples of the reaction mixture at given intervals and measuring a physical or chemical property thereof, e.g. specific gravity. The amount of copolymer formed can be determined from the specific gravity of the reaction mixture. When the relationship between copolymer formed and specific gravity is correlated, the required rate of addition of emulsified monomer mixture is known.

The emulsifying agents employed in this invention are those commonly used in emulsion polymerization processes and are well known in the art. Suitable emulsifying agents include, e.g. soaps such as sodium and/or potassium myristate, laurate, oleate and stearate; alkali metal alkyl or alkylene sulfates or sulfonates such as potassium lauryl sulfate and stearyl sulfonate and the ammonium or ethanolamine salts thereof; water-soluble salts of sulfonated long chain mono and di-alkyl substituted aryl hydrocarbons such as diisobutyl naphthalene sodium sulfonate and decyl benzene sodium sulfonate; and polyoxyethylene derivatives of alcohols, acids, ethers, phenols, amides, amines, etc., a large number of which generally satisfy one of the following formulae:

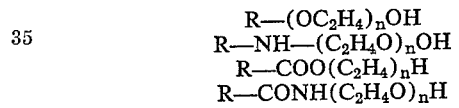

wherein R is an aliphatic, aryl or alkyl-aryl hydrocarbon radical and $n$ is an interger of 6 to 30.

Among commercially available emulsifying agents which can be used in accordance with the present invention there may be mentioned the product "Alphenyl" which corresponds to the first of the aforementioned formulae in which R is the butylphenylene radical and $n$ is 8, said product resulting from the condensation of about 8 mols of ethylene oxide with one mol of butyl phenol and the "Polyrad" products which correspond to the second of said formulae, where R—NH is the residue of rosin amine (dehydroabietylamine) R—$NH_2$. In "Polyrad 1100," e.g. the integer $n$ is equal to 11. "Emulphor" A and "Ethofat 6060" are trade names of products which correspond to the third formulae, RCOO— being the residue of oleic acid in the former and stearic acid in the latter. Finally "Base LP12" is the trade name or a product corresponding to the first formula in which R is the residue of lauryl alcohol.

In carrying out the process of this invention water-soluble polymerization catalyst is present in the aqueous phase of the emulsion polymerization reaction mixture. Some water-soluble catalyst is present in the initial reaction mixture in order that initial copolymerization will occur. The remaining water-soluble catalyst can be present in the initial reaction mixture at the start of the polymerization or it can be added during the reaction in a continuous or semi-continuous manner. In the preferred embodiment of this invention, monomer-soluble catalyst is also present during the reaction. The monomer soluble catalyst is admixed with the monomers present in the emulsified monomer mixture added during the reaction before the monomers are emulsified.

The polymerization catalysts used in this invention can be any of the well-known free-radical mechanisms and the reduction oxidation catalyst systems known as Redox systems as long as the specific compound selected possesses the required solubility characteristics. Any of the well-known Redox systems catalysts such as potassium persulfate/sodium bicarbonate can be used in this invention.

When polymerization is initiated and carried on by virtue of free-radicals, such radicals can be derived from added free-radical-supplying catalysts such as e.g., the peroxide polymerization catalysts and the azo-type polymerization catalysts. Those skilled in the art are now fully familiar with a large number of peroxide polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. Peroxide catalysts include, for example, benzoyl peroxide, ditertiary butyl peroxide, tertiary butyl hydroperoxide, diacetyl peroxide, diethyl peroxycarbonate, 2 - phenyl propane - 2 - hydroperoxide (known also as cumene hydroperoxide) among the organic peroxides; and hydrogen peroxide, sodium or potassium persulfate, perborates and percarbonate, and other "per" compounds among the inorganic peroxides. The azo-type polymerization catalysts are also well-known to these skilled in the art. These are characterized by the presence in the molecule of the group —N=N— bonded to one or two organic radicals, preferably at least one of the bonds being to a tertiary carbon atom. Azo-type catalysts include, for example, $\alpha,\alpha'$-azodiisobutyronitrile, p - bromobenzenediazonium fluoborate, N - nitroso-p-bromoacetanilide, azomethane, phenyldiazonium halides, diazoaminobenzene, p-bromobenzenediazonium hydroxide and p-tolyldiazoaminobenzene.

By way of example suitable water-soluble polymerization catalysts employed in this invention include hydrogen peroxide, sodium or potassium persulfate, perborate and percarbonate, ammonium persulfate and Redox systems. The water-soluble polymerization catalyst is used in small but catalytic amounts, which are generally not in excess of one percent by weight based upon the monomeric material. A suitable quantity is often in the range of 0.05 to 1.0 percent by weight with 0.25 percent to 0.75 percent by weight perferred.

By way of example suitable monomer-soluble polymerization catalysts employed in this invention include benzoyl peroxide, lauroyl peroxide, t-butyl-peroxide, t-butyl-hydroperoxide, dicumyl hydroperoxide, cumene hydroperoxide, azobisisobutylronitrile, $\alpha,\alpha'$ - azodiisobutyronitrile and bis-benzene diazosuccinate. The amount of monomer-soluble polymerization catalyst employed in this process is not critical. Minor amounts have been found to be suitable. Normally an amount between about 0.05 percent and 0.7 percent based on the monomers is employed although the preferred amount is from about 0.1 percent to 0.5 percent.

While aqueous emulsion polymerization can be conducted at temperatures ranging from a temperature just above the freezing temperature up to the reflux temperature of the aqueous reaction mixture, more practical operating temperatures in accordance with this invention are in the range of about 35° C. to 100° C.

The invention is further illustrated by the following examples. Parts and percent are by weight unless otherwise indicated.

In the examples, Duponol-ME is a trade name for the sodium salt of lauryl sulfate; Triton X–770 is a trade name for the sodium salt of an alkyl aryl polyether sulfate; Triton X–100 is a trade name for an isooctylphenoxypolyethoxyethanol and Phosphotex is the trade name for tetrasodiumpyrophosphate.

EXAMPLE 1

Styrene/di-2-ethylhexyl fumarate (DEHF) copolymer latex is prepared from the following ingredients.

(A) Initial reaction mixture

| | Parts |
|---|---|
| (1) Styrene | 20 |
| DEHF | 6 |
| (2) Duponol ME | 0.52 |
| $Na_2S_2O_5$ | 0.15 |
| Phosphotex | 0.12 |
| Water (distilled) | 170 |
| (3) $K_2S_2O_8$ | 0.15 |
| Water | 10 |

(B) Monomer mixture

| | |
|---|---|
| Styrene | 110 |
| DEHF | 90 |
| Water | 90 |
| Duponol ME | 4 |

(C) Initiator mixture I

| | |
|---|---|
| $K_2S_2O_8$ | 1.0 |
| Water | 100 |

(D) Reducer mixture

| | |
|---|---|
| $Na_2S_2O_5$ | 1.0 |
| Water | 100 |

(E) Initiator mixture II

| | |
|---|---|
| Water | 20 |
| $K_2S_2O_8$ | 0.2 |
| Duponol ME | 0.4 |

The initial reaction mixture (A–1, 2 and 3) is charged to a nitrogen-purged reaction vessel equipped with thermometer, stirring means, reflux condenser fitted with a Dean and Stark trap and two addition funnels. The reaction vessel is purged with nitrogen throughout the polymerization reaction. The initial reaction mixture is heated at 40° C. for 15 minutes and then monomer mixture B which has been pre-emulsified under nitrogen in a Warinng Blendor to the consistency of heavy cream is added continuously to the reaction vessel over a four hour period at the rate of about 49 parts per hour. Initiator Mixture I and the Reducer Mixture are each added at the rate of about two parts every five minutes over the four hour addition period. The reaction temperature is maintained at about 40° C. during the addition period. At the end of the four hour addition period the reaction mixture is refluxed at about 90° C. for about ½ hour and then Initiator Mix II is added over a ½ hour period at about 3.3 parts every 5 minutes. The resulting latex is heated to about 99° C. and 23 g. of styrene are recovered in a Dean and Stark Trap over a 30 minute period. The latex, 588 grams, is removed from the reaction vessel and about 26 grams of oily coagulum is separated from the latex. The 562 grams of latex contains about 30.8 percent solids. A film cast from a portion of the latex is flexible, continuous and nontacky. The remaining portion of the latex, 100 grams, is frozen, thawed, filtered, slurried with methyl alcohol and filtered. The copolymer is then dissolved in tetrahydrofuran, precipitated in methyl alcohol and dried under vacuum at 80° C. for 16 hours. The methyl alcohol insoluble fraction of the dried copolymer is 94 percent and the copolymer contains about 53 percent styrene and 47 percent fumarate. The methyl alcohol insoluble copolymer has a Clash-Berg $T_f$ of 8 and $T_{2000}$ of 53, and a 25° C. modulus of 44,000 p.s.i.

EXAMPLE 2

The following are charged to a nitrogen purged glass reaction vessel in the order given.

(A)

| | Parts |
|---|---|
| $K_2S_2O_8$ | 0.2 |
| Duponol ME | 0.8 |
| Water | 70 |

(B)

| | |
|---|---|
| Di-2-ethylhexyl fumarate | 18 |
| Styrene | 22 |

(C)

| | |
|---|---|
| $N_2S_2O_5$ | 0.17 |
| Water | 10 |

After C is added the reaction vessel is sealed under nitrogen, shaken, placed in a water bath at 58° C. and rotated for 5 hours. At the end of this period the reaction mixture is removed from the reaction vessel, frozen, thawed, slurried with 500 ml. water, filtered, slurried with methyl alcohol and filtered. The polymer is then dissolved in tetrahydrofuran, precipitated in methyl alcohol and dried under vacuum at 80° C. for 16 hours. About 15.9 grams of polymer is recovered. The methyl alcohol used in the purification is evaporated and the residue, about 18 grams, is primarily di(2-ethylhexyl)fumarate.

Example 2 shows that simple batch emulsion polymerization processes will not copolymerize styrene and long chain dialkyl fumarates.

EXAMPLE 3

Styrene/di-2-ethylhexyl fumarate (DEHF) copolymer is prepared from the following ingredients.

(A) Initial reaction mixture

| | |
|---|---|
| (1) Styrene | 20 |
| DEHF | 10 |
| (2) Water | 168.6 |
| Triton X-770 | 0.60 |
| Triton X-100 | 0.85 |

(B) Monomer mixture

| | |
|---|---|
| Styrene | 100 |
| DEHF | 100 |
| Water | 80 |
| Triton X-770 | 11.3 |

(C) Catalyst mixture

| | |
|---|---|
| Water | 200 |
| $K_2S_2O_8$ | 1.90 |

The initial reaction mixture (A-1 and 2) is charged to a nitrogen purged reaction vessel equipped with thermometer, stirring means, reflux condenser fitted with a Dean and Stark trap and two addition funnels. The initial reaction mixture is reuuxed at about 98° C. for 15 minutes and then monomer mixture B which has been emulsified in a Waring Blendor under nitrogen is added at a constant rate over a 3¾ hour period. Catalyst mixture C is added at a constant rate over a 4¾ hour period beginning 15 minutes prior to the addition of emulsified monomer mixture B. At the end of the catalyst addition the resulting latex is distilled and 23 g. styrene are recovered in a Dean and Stark trap over about a 45 minute period. The latex is removed from the reaction vessel and about 29 grams of oily coagulum is separated from the latex.

EXAMPLE 4

The procedure of Example 3 is repeated except that one part benzoyl peroxide is admixed with the monomers in monomer mixture B prior to emulsification. At the end of the catalysts addition the resulting latex is distilled and 17 gm. styrene are recovered over about a 30 minute period. The latex is removed from the reaction vessel and no oil, gummy residue or coagulum is present.

As mentioned hereinbefore, the stability of styrene/ dialkyl fumarate latices is impaired by the presence of large amounts of coagulum. Example 4 above shows that the use of a monomer-soluble catalyst admixed with the monomers added during the reaction in addition to the water-soluble catalyst in the aqueous phase results in increased conversion of styrene and dialkyl fumarate and thus increased latex stability.

EXAMPLES 5–8

The procedure of Example 1 is repeated except that in each example a different dialkyl fumarate is used in place of di-2-ethylhexyl fumarate. Results and further details are presented below in Table 1.

TABLE 1

| Example No. | Dialkyl fumarate | Styrene recovered, gm. | Coagulum, gm. |
|---|---|---|---|
| 5 | Di-n-octyl fumarate | 26 | 30 |
| 6 | Di-n-decyl fumarate | 70 | 55 |
| 7 | Di-trimethylheptyl fumarate | 31 | 38 |
| 8 | n-Butyl-n-dodecyl fumarate | 52 | 47 |

Examples 5–8 above are repeated except that in addition to the water-soluble catalyst in the reaction mixture, a monomer-soluble catalyst (benzoyl peroxide) is admixed with the monomers added during the reaction before they are emulsified. In each example the amount of coagulum is substantially reduced and a more stable latex is formed.

The copolymers prepared according to this invention may be used for the preparation of plastics, coatings, fibers, films, foils and adhesives. For any of these purposes, the polymers may be combined with or prepared in the presence of plasticizers, stabilizers, fillers, pigments, dyes, softeners, natural resins or other synthetic resins.

In cases in which the copolymers are to be used as coating or impregnating agents for porous materials, the latices may be applied directly to the material to be coated without the intermediate isolation of the polymer.

Examples of dialkyl fumarates which can be copolymerized with styrene in accordance with this invention include:

di-n-octyl fumarate
dinonyl fumarate
didecyl fumarate
diisooctyl fumarate
ethyloctadecyl fumarate
propylheptadecyl fumarate
ethyltetradecyl fumarate
butyldodecyl fumarate
hexyldecyl fumarate
heptyldecyl fumarate
octyldecyl fumarate
nonyldecyl fumarate

What is claimed is:

1. Process for the copolymerization of styrene and dialkyl fumarates containing from 20 to 24 carbon atoms which comprises subjecting a mixture of said monomers to polymerization conditions in aqueous emulsion in the presence of water-soluble polymerization catalyst, introducing an emulsified mixture of said monomers to the reaction mixture at about the time copolymerization begins, the composition of said added monomers being substantially the same as the composition of the monomers chemically combined in the forming copolymer, continuing the addition of emulsified monomer mixture during a substantial part of the copolymerization period at about the same rate copolymer is formed.

2. Process of claim 1 wherein the dialkyl fumarate is di-n-octyl fumarate.

3. Process of claim 1 wherein the dialkyl fumarate is di-2-ethylhexyl fumarate.

4. Process of claim 1 wherein the dialkyl fumarate is di-n-decyl fumarate.

5. Process of claim 1 wherein the monomers in the emulsified monomer mixture introduced during the reaction are admixed with a monomer-soluble polymerization catalyst prior to emulsification.

6. A process for the copolymerization of styrene and dialkyl fumarates containing from 20 to 24 carbon atoms which comprises subjecting a mixture of said monomers containing 93 percent to 55 percent styrene to polymerization conditions in aqueous emulsion in the presence of water-soluble polymerization catalyst, introducing an emulsified mixture of said monomers containing 38 percent to 76 percent styrene to the reaction mixture at about the time copolymerization begins, the composition of said added monomers being substantially the same as the composition of the monomers chemically combined in the forming copolymer, continuing the addition of emulsified monomer mixture during a substantial part of the copolymerization period at about the same rate copolymer is formed.

References Cited

UNITED STATES PATENTS 3,033,812　5/1962　Isaacs et al.
2,559,155　7/1951　Chapin et al. _____ 260—85.5

FOREIGN PATENTS 508,610　12/1954　Canada.

JOSEPH L. SCHOFER, *Primary Examiner.*

JOHN KIGHT, *Assistant Examiner.*